R. P. PERRY.
MATERIAL IN FILAMENTARY FORM, AND PROCESS FOR MAKING THE SAME.
APPLICATION FILED MAR. 27, 1917.
1,289,892.
Patented Dec. 31, 1918.
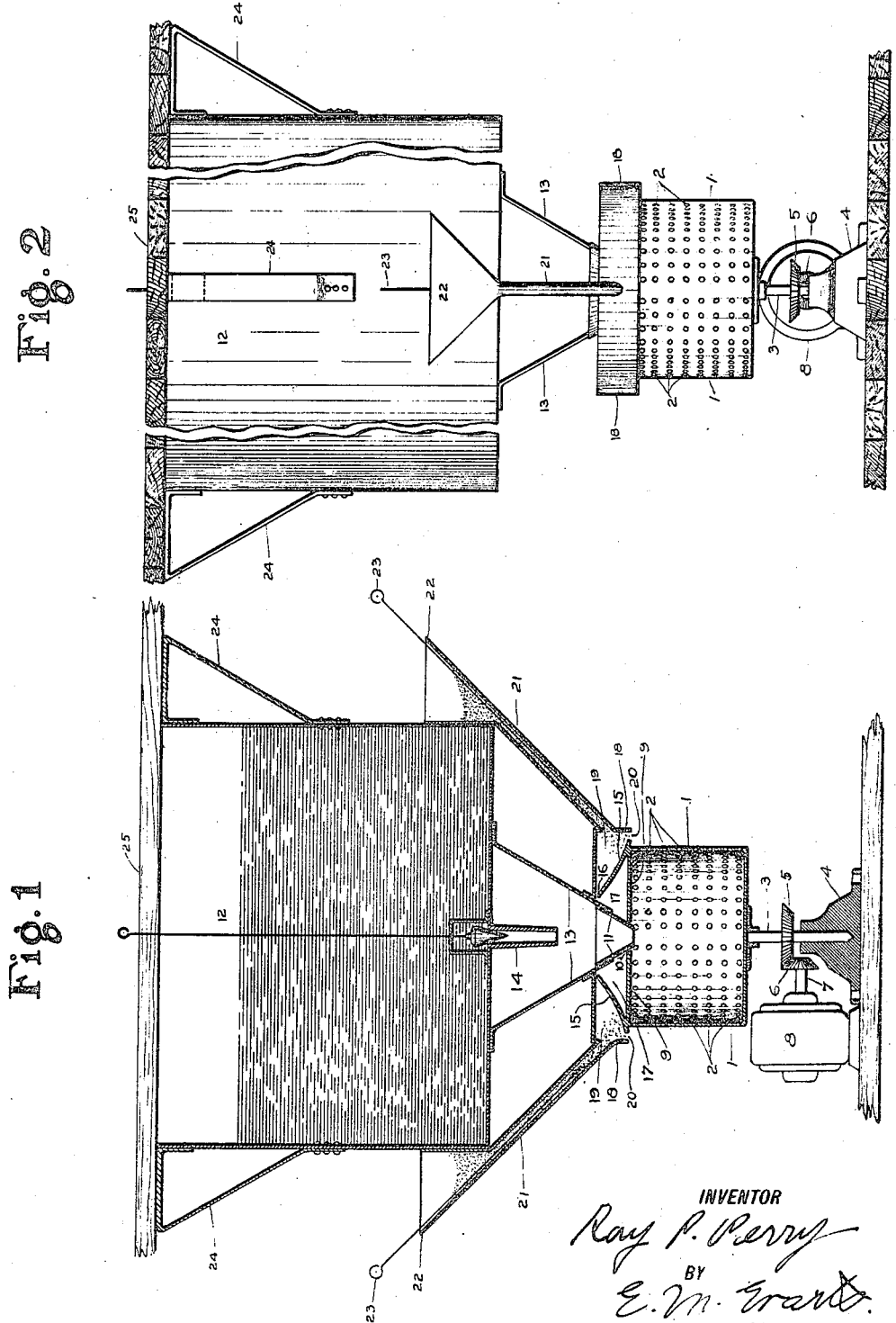
INVENTOR
Ray P. Perry
BY
E. M. Evarts.
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF NEW JERSEY.

MATERIAL IN FILAMENTARY FORM AND PROCESS FOR MAKING THE SAME.

1,289,892.

Specification of Letters Patent.   Patented Dec. 31, 1918.

Application filed March 27, 1917.   Serial No. 157,752.

*To all whom it may concern:*

Be it known that I, RAY P. PERRY, a citizen of the United States, residing at Upper Montclair, in the county of Essex and State of New Jersey, have invented certain new and useful Improvements in Materials in Filamentary Form and Processes for Making the Same, of which the following is a specification.

This invention relates to materials of a bituminous or pitch-like nature such as hard or soft coal tar pitch, asphalt, or other solid bitumens having a similar physical property of gradually changing from a solid to a liquid state on the application of heat, whereby the same may be obtained in the form of hair-like filaments for use in the manufacture of construction and insulation materials, and for other purposes subsequently to be described. While I shall describe my invention more particularly in connection with hard or soft coal tar pitch and asphalt, it is to be understood that my invention may be successfully applied to these materials alone or any mixture of two or more such materials in any proportions desired provided the mixture has the physical property mentioned above. Furthermore wherever the term "bituminous" is used in the specification and claims, I mean to designate by this term any of the materials of the classes previously referred to, or any mixtures of two or more such materials in any desired proportions. Moreover my invention comprises processes for obtaining such hair-like or filamentary bodies as well as the filamentary bodies themselves.

In the preparation of various bituminous articles or materials, such as bituminous insulating packings or other materials where solid bitumens are employed, I have found that solid bitumens of a hairy or filamentary form are most desirable and suitable, since a mass of such filamentary solid bituminous material may be easily handled; and the filamentary form is peculiarly useful and desirable in the manufacture of such materials as bituminous insulating packings, etc. In the last-mentioned use of the bituminous filaments, the bitumen, being in the form of fibers, or filaments, forms, when matted or felted together in any degree of compactness desired, a bituminous heat insulating or similar packing of very desirable properties. This is specified merely as illustrating one of the uses to which the filaments may be put and is not intended to indicate exclusive use, or to restrict their use in any sense.

I have found that other fusible water-proofing materials such as resins which become plastic at certain temperatures and gradually change from a solid to a liquid state upon the application of heat can be treated in a manner similar to bituminous materials to produce filaments therefrom. The invention can generally be applied to various materials which have considerable extensibility while they are in a soft or plastic condition intermediate between their solid and liquid states.

Referring to the drawing, wherein I have illustrated one form of apparatus in which my process may be practised and my product produced, Figure 1. is a view, partly in section and partly in elevation, of a device which may be used for making bituminous filaments, and Fig. 2. is a view similar to that shown in Fig. 1 but taken at substantially right angles thereto.

While any type of extrusion, centrifugal, die-expression, or other type of filament-forming machine may be employed with success in making the bituminous filaments which are one of the objects of my invention, I prefer to use a machine of the type illustrated in the drawings, wherein 1 is a substantially cylindrical container having one or more rows of apertures 2, substantially horizontally disposed. It is preferable to have the apertures 2 circular in shape, but any other desired or suitable shape may be used. The container 1 is driven or rotated at any desired rate of speed by being mounted on the shaft 3 which is supported in the bearing 4. Fixedly mounted on shaft 3, a small distance above the bearing 4, is a bevel gear 5 which meshes with a corresponding bevel gear 6, which is fixed on the shaft 7 of an electric or other motor 8. By setting the motor 8 in operation it is obvious that the container 1 will be rotated through the mediation of the bevel gears 5 and 6.

The container 1 has a substantially annular cover 9, which cover has a substantially central circular or other opening through which the bituminous material is fed into the container. While it is possible to feed the bituminous material into the container 1 in a solid condition and melt it in the container by means of any suitable source of heat which may be applied to the container 1, as a circular or other gas burner, or an electric heater, I prefer in the treatment of large quantities of bituminous material, to feed the bituminous material into the container 1 in an already molten condition, thereby greatly facilitating the operation of the device, and rendering possible the treatment of large quantities of material at one time. Since the material is fed into the container 1 in a molten condition, any number of rows of apertures 2 may be provided without necessitating a high temperature source of heat applied to the container.

The molten bituminous material is fed through the opening 10 into the container 1 by means of a funnel-shaped member 11 which is carried by the tank 12 by means of a strap or support 13. The tank 12 contains bituminous material in a molten condition, the stop-cock 14 controlling the amount and rate of flow. The funnel member extends into the opening 10 but does not touch the cover 9.

In order to provide the filaments, if desired, with a coating or covering of material to prevent the filaments from being too sticky or adherent when matted or felted together, I provide the annular inclined member 15 which is fixed to the cover 9 of the container 1 so as to rotate with the latter when it is rotated. The funnel member 11 passes through the opening 16 of the inclined member 15 so as to be slightly clear of the same. The air space 17 between the cover 9 and the inclined member 15 may serve as a heat-insulating member to help maintain the bituminous material in a molten condition. Or if desired, the space 17 may be filled with asbestos or other heat-insulating material. Fastened to the funnel member 11, or maintained by any other means in a fixed position, is the annular inverted dish-shaped member 18, which cooperates with the member 15 to provide a chamber 19 which holds the material with which, if desired, the filaments may be covered as extruded to render the same less sticky and adherent. The covering material which may consist of finely divided soapstone or talc, issues through the annular opening 20, through which it is fed by the action of the moving inclined annular member 15, which moves the powdered covering material toward the opening 20. The space 19 is supplied with powdered material by means of the tubes 21 which are provided with funnels 22, and which may have rods 23 in the tubes to loosen up the powdered material should it become clogged in the tubes.

The tank, to which the funnel member 11 and the member 18 are attached, is removably supported by brackets 24 under the shelf 25, or in any other convenient way.

In operation, the molten bituminous material is fed from the tank 12 through the valve or stop-cock 14 into the funnel member 11 and thence into the container 1. The container 1 is rapidly rotated at any desired rate of speed by the meshing bevel gears 6 and 7 which are set in motion by the motor 8. Due to the centrifugal force of the rapidly rotating container 1 the molten bituminous material is forced or extruded through the apertures 2 in the form of filaments which solidify shortly after striking the comparatively cool air. The filaments fall in a solidified condition upon the floor or other support where they are gathered together and put to any desired use. For example, the filaments may be more or less closely packed together to form a felt or mat which may be used with considerable success as a heat insulating packing. If so desired, the bituminous filaments, such as pitch, whether or not covered with anti-sticking material, such as finely powdered soapstone, may be slightly softened or fused when matted or felted together so that the filaments will be, in a certain sense, cemented together at their points of intersection. In this way the porous body or felt containing the bituminous filaments is rendered stronger.

However used, it may be desirable to coat or cover the filaments with a covering of material to render the same less sticky or adherent. This may be accomplished by the mechanism illustrated, whereby the filaments, as they are extruded and when they are therefore still in a semi-molten condition, are sprinkled with a fine dust of finely divided talc or soapstone fed through the opening 20 by the rotating annular inclined member 15. The dust or powder of talc or soapstone adheres to the filaments and therefore provides them with a coating of protective, non-adherent material. Or, as above set forth, the filaments, as formed or thereafter, may be dropped into and stored under water, or may be sprayed with water as extruded. For this latter purpose water may be fed into the tube 21 and out through the opening 20 over the filaments.

With materials, which are not sticky when cold, it is unnecessary to coat the filaments, as there is little danger of their sticking together. For example, pitch filaments made of hard pitch assume the shape of long, substantially cylindrical bodies which become quite hard and brittle and do not stick together, if sufficiently cooled before they fall to the floor from the apparatus in which they are formed. These filaments do not readily mat or cling together but can be made to do so by the application of sufficient heat and pressure. In their form as separate filaments they are very convenient to handle and to comminute for such purposes as the making of construction materials as above mentioned and as more particularly set forth in my co-pending application Serial No. 161,670, filed April 12, 1917.

In operating the device, care must be taken not to have the molten bituminous material too cool or viscous in which case the filaments will not be formed at all, or only slowly and with great difficulty. Care should also be taken not to have the bituminous material too hot or fluid, since in such a case the molten bituminous material will be solidified in the form of shot, rather than in the form of filaments. The proper consistency of the molten bituminous material for successful operation of my process may be readily determined by trial. Moreover, the dimensions of the filaments may be varied and controlled not merely by controlling the temperature of the molten bituminous material, but also by varying the speed of rotation of the spinning apparatus, greater speed resulting in a smaller filament, and vice versa. Generally the filaments range from one-tenth of an inch or more to one hundredth of an inch or less in diameter, and from a fraction of an inch to several inches in length.

The present case is a continuation in part of my copending earlier application filed April 14, 1916, and bearing Serial No. 91,121 wherein I have described bituminous material in the form of rods or filaments.

What I claim is:

1. As an article of manufacture, bituminous material in the form of slender, substantially cylindrical hair-like, mechanically formed bodies of appreciable size, substantially as described.

2. As an article of manufacture, a slender, substantially cylindrical, mechanically formed body of appreciable size, composed of bituminous material that is solid at ordinary temperatures, substantially as described.

3. As an article of manufacture, pitch in the form of slender, substantially cylindrical, mechanically formed bodies of appreciable size, substantially as described.

4. As an article of manufacture, a fibrous, heat-insulating body consisting of a felted mass containing filaments of pitch, substantially as described.

5. As an article of manufacture, a fibrous, heat-insulating body containing filaments of pitch, substantially as described.

6. As an article of manufacture, a mechanically formed filament of pitch of appreciable size and a superficial film of material thereon to render the same substantially non-adherent, substantially as described.

7. As an article of manufacture, a mechanically formed filament of pitch of appreciable size and a superficial coating of finely divided mineral matter thereon to render the same substantially non-adherent, substantially as described.

8. As an article of manufacture, an easily visible mechanically formed filament of bituminous material and a coating of anti-sticking material of finely divided soapstone thereon to render the same substantially non-adherent, substantially as described.

9. As an article of manufacture, a mechanically formed filament of pitch of appreciable size and a coating of finely divided soapstone thereon to render the same substantially non-adherent, substantially as described.

10. As an article of manufacture, a porous, fibrous, body containing filaments of bituminous material cemented together by slightly fusing the same, substantially as described.

11. As an article of manufacture, a porous, fibrous, body containing filaments of pitch, cemented together by slightly fusing the same, substantially as described.

12. As an article of manufacture, a porous body consisting of filaments of bituminous material cemented together by slightly fusing the same, substantially as described.

13. As an article of manufacture, a porous body consisting of filaments of pitch cemented together by slightly fusing the same, substantially as described.

14. As an article of manufacture, a fibrous, heat-insulating body containing filaments of bituminous material, substantially as described.

15. As an article of manufacture, a porous body consisting of a felted mass containing filaments of solid, bituminous material, substantially as described.

16. As an article of manufacture, an easily visible mechanically formed filament of bituminous material and a superficial coating of anti-sticking material thereon to render the same substantially non-adherent, substantially as described.

17. As an article of manufacture, a bituminous insulating body consisting of a felted mass containing filaments of bituminous material, the said filaments having a covering of material to render the same substantially non-adherent, substantially as described.

18. As an article of manufacture, a bituminous insulating body consisting of a felted mass containing filaments of bituminous material, the said filaments having a covering of finely divided mineral matter to render the same substantially non-adherent, substantially as described.

19. The process of making filaments of solid bituminous material which comprises providing a supply of molten bituminous material; extruding the molten material through apertures of the desired character, and bringing the extruded material from each aperture into contact with a cooling medium for a considerable length of time while it is out of contact with the material extruded from each of the other apertures, whereby the same is substantially solidified in filamentary form, substantially as described.

20. The process of making filaments of solid, bituminous material which comprises providing a supply of molten bituminous material; extruding the molten material through apertures of the desired character; bringing the extruded material into contact with a cooling medium, whereby the same is substantially solidified in filamentary form; and coating the filament with a material to render the same substantially non-adherent, substantially as described.

21. The process of making filaments of solid, bituminous material, which comprises providing a supply of molten bituminous material; extruding the molten material through apertures of the desired character; bringing the extruded material into contact with a cooling medium, whereby the same is substantially solidified in filamentary form; and coating the filaments with a finely divided mineral material to render the same substantially non-adherent, substantially as described.

22. The process of making filaments of solid bituminous material, which comprises providing a supply of molten bituminous material; extruding the molten material through apertures of the desired character; bringing the extruded material into contact with a cooling medium, whereby the same is substantially solidfied in filamentary form; and coating the filaments shortly after the same are extruded with a finely divided material to render the same substantially non-adherent, substantially as described.

23. The process of making filaments of solid bituminous material which comprises providing a supply of molten bituminous material; extruding the molten material by centrifugal action through apertures of the desired character; bringing the extruded material into contact with cooling air, whereby the same is substantially solidified in filamentary form; and coating the filaments shortly after the same are extruded with a finely divided mineral material to render the same substantially non-adherent, substantially as described.

24. The herein described process of cooling hot liquid pitch and the like which consists in subdividing said pitch and the like into a plurality of slender, substantially cylindrical bodies which present a very large cooling surface and projecting the same through the air.

25. The process of making filaments of different sizes which comprises the steps of introducing molten material into a centrifugal machine with perforated walls, regulating the speed of said machine, and regulating the temperature of said molten material.

26. As an article of manufacture, fusible waterproofing material in the form of slender, substantially cylindrical, hair-like, mechanically formed bodies of appreciable size, substantially as described.

In testimony whereof I affix my signature.

RAY P. PERRY.